United States Patent
Izuta

[15] 3,695,248
[45] Oct. 3, 1972

[54] VIBRATION DAMPENING CORE FOR AN ARCHERY BOW

[72] Inventor: Tadao Izuta, Hamamatsu, Japan

[73] Assignee: Nippon Gakki Seizo Kabushiki Kaisha, Hamamatsu-shi, Japan

[22] Filed: July 24, 1970

[21] Appl. No.: 57,998

[52] U.S. Cl............124/30 R, 273/DIG. 7, 124/24, 161/165
[51] Int. Cl..............................................F41b 5/00
[58] Field of Search............124/30 R, 23, 24, 21, 20; 46/23–26; 161/165

[56] References Cited

UNITED STATES PATENTS

| | | | |
|---|---|---|---|
| 3,537,440 | 11/1970 | Izuta | 124/30 R |
| 2,945,488 | 7/1960 | Cravotta et al. | 124/23 |

Primary Examiner—Richard C. Pinkham
Assistant Examiner—William R. Browne
Attorney—Ostrolenk, Faber, Gerb & Soffen

[57] ABSTRACT

A core of composite structures is employed as a vibration absorbing section of an archery bow comprising ordinarily two relatively hard but flexible elongated members made of for instance, maple wood, beech wood, bamboo, or a resilient synthetic resin reinforced with glassfibers and a resilient sheet member made of, for instance, rubber or a synthetic resin such as ABS resin interposed between said two elongated members in a manner to extend in a lengthwise direction thereof, all of said members are bonded together to form one composite structure having a configuration generally flat and of rhombic or triangular form with a maximum thickness at an intermediate portion thereof and gradually reduced thickness toward both ends thereof. The composite structures are positioned between the handle and a bow limb so as to absorb vibrations developed in a bow limb.

4 Claims, 9 Drawing Figures

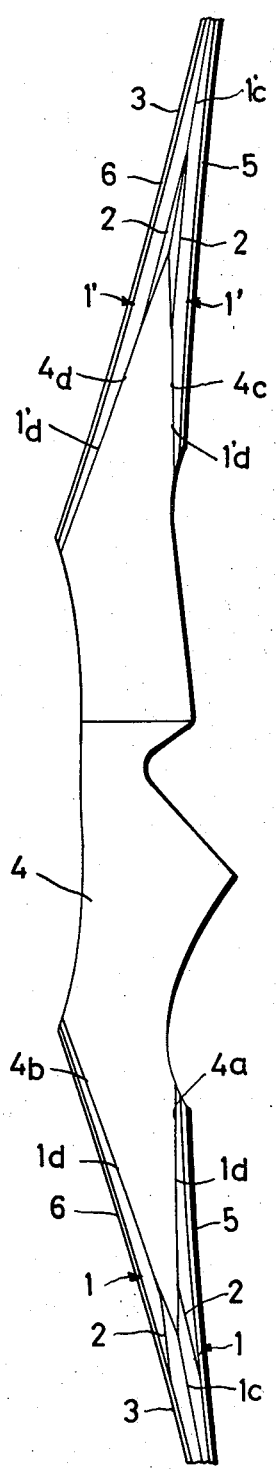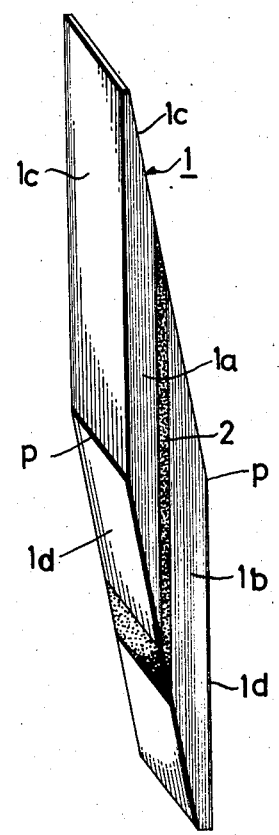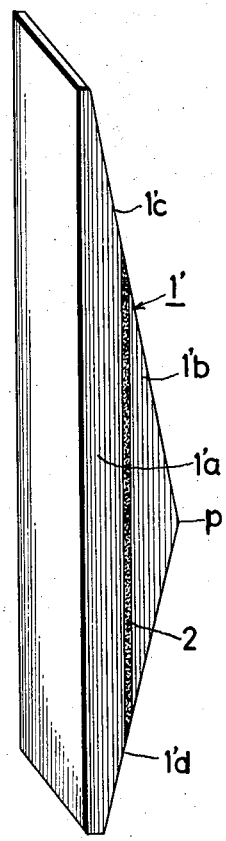

HANDLE    LIMB

HANDLE    LIMB

HANDLE    LIMB

INVENTOR
Tadao Izuta

BY Ostrolenk, Faber, Gerb & Soffen
ATTORNEYS

VIBRATION DAMPENING CORE FOR AN ARCHERY BOW

BACKGROUND OF THE INVENTION

This invention relates to a core of individual composite structures employed in an archery bow, and more particularly to a type employed as a core of limb sections joining the limb sections to handle section in a composite type archery bow.

Heretofore, an archery bow of composite construction having a handle section made of a hard wood and a pair of limb sections made of a laminated sheet material, has usually been produced by simply bonding together different pieces of materials with core materials of simple construction interposed therebetween.

However, because of the difference in the flexibility of the handle section made of a hard wood and of the limb sections made of a flexible material, a sharp change in the distribution of the bending stress has been always exhibited in the portions joining the handle section and the limb sections of the conventional archery bow. This in turn causes an excessive concentration of energy stored in said junction portions, and fatigue of the component materials at the portions and shortening of the work life have been inevitable.

More specifically, if each end of the handle section to be scarf-joined with the limb section is made thinner into a sharp pointed configuration, the thinner end portion of the handle section made of a hard wood is subjected to an excessive bending stress, when the archery bow is drawn, and if the tapered angle at the end of the handle section is made comparatively blunt, and if cores fixed to said end are of substantially uniform thickness, an abrupt turning point or an abruptly bent portion in the taper will appear on the surface of the scarf-joined portion at a position corresponding to the end of the handle section. The abrupt turning point or abruptly bent portion in the taper causes the bending stress and the strain energy to concentrate on the scarf-joined portion, thus hindering the distribution of energy throughout the entire bow.

SUMMARY OF THE INVENTION

Therefore, the primary object of the present invention is to provide a core material adapted for use as a core of a limb section of an archery bow joined to a handle section thereof.

Another object of the present invention is to provide a core material having a good bending stress distribution characteristics, whereby a concentration of bending stresses on the scarf joints is avoided.

Still another object of the present invention is to provide a composite structure formed into a suitable configuration so that the joining portion of the archery bow is rendered to have a smooth variation of the thickness.

Further object of the present invention is to provide a composite structure having an elastic sheet member therein whereby shock and vibration developed in bow limbs which shooting an arrow will be effectively absorbed or damped.

Still further object of the present invention is to provide for an archery bow using the above-mentioned core material a core for the limb sections.

These are other objects of the invention can be achieved by the employment of a core material which comprises at least two comparatively hard but flexible elongated members made of, for instance, bamboo, maple wood, beech wood, or a resilient synthetic resin reinforced with glassfibers and at least one resilient sheet member made of, for instance, rubber or synthetic resin interposed there-between in a manner to extend in a lengthwise direction thereof, all of said members being bonded together to form one composite structure having a generally flat rhombic or triangular configuration with a maximum thickness at a substantially central portion thereof and gradually reduced thickness toward the opposite ends of the core material.

The invention will be better understood from the following description when read in conjunction with the accompanying drawings.

BRIEF DESCRIPTION OF DRAWINGS

In the drawings:

FIG. 1 is a perspective view of the first form of core material according to the present invention;

FIG. 2 is a perspective view of the second form of core material according to the invention;

FIG. 3 is a profile view of an archery bow wherein core materials of this invention are employed;

DETAILED DESCRIPTION OF INVENTION

Figure 4A:
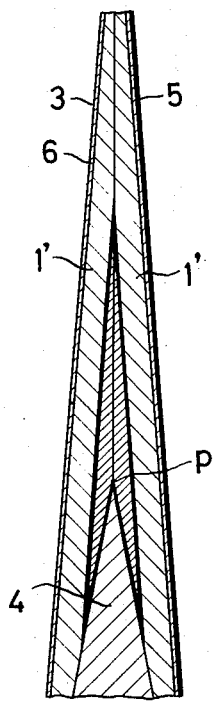
FIG. 4(A), 4(B), and 4(C) are profile views, in section, showing an essential part of the archery bows wherein core material of this invention and core materials of the conventional types having substantially uniform thickness are employed, respectively.

Referring to FIG. 1 showing an example of composite structure according to the present invention, which is employed in a composite type archery bow combining different materials for a handle section and limb sections thereof, there are two elongated members $1a$ and $1b$ of relatively hard but flexible material either of which is formed into substantially flat rhombic configuration, one being slightly larger than the other. The two elongated members $1a$ and $1b$ are bonded together through at least one resilient sheet member 2 interposed therebetween, in a manner to extend in a lengthwise direction of the elongated members. All of the members $1a$, $1b$ and 2 thus form one composite structure having a configuration such that the thickness of the fixedly bonded core material 1 is maximum at a substantially intermediate point P thereof and is gradually reduced along its length towards the ends of the core material 1 as apart from the point P.

The composite structure 1 has two faces $1c$ and $1d$ at each side thereof, the two faces $1c$ and $1d$ being included at an angle with respect to each other and meeting at the point P of maximum thickness. One of the faces $1c$ or $1d$ is to be bonded to the end of the handle section of the archery bow.

In FIG. 2, there is indicated the second example of a composite structure generally designed by numeral $1'$. In this example the composite structure $1'$ is composed of at least two elongated members $1'a$ and $1'b$ of relatively hard but flexible material, of which the member $1'a$ is made into a flat trapezoidal configuration and another member 1'b is made into a flat triangular confiiguration. The two elongated members 1'a and 1'b are bonded together through at least one resilient sheet member 2' as in the case of the first example. All of the members 1'a, 1'b, and 2' thus form one composite structure having a configuration such that the thickness of the core material 1' is maximum of a substantially intermediate point P thereof and is gradually reduced toward the ends of the core material 1'.

The composite structure 1' has two faces 1'c and 1'd at one side thereof, the two faces 1'c and 1'd being inclined at an angle with respect to each other and meeting at the point P of maximum thickness. One of the faces 1'c and 1'd is to be bonded to the end of the handle section of the archery bow.

These types of the composite structure 1 and 1' may be employed suitably depending on the types of the archery bows. For instance, two of the first type of composite structure 1 may be employed as cores of one of the limb sections of the archery bow, the core materials 1 being joined to the front and rear sides of the handle section at one end, and two composite structure 1' may be used as cores of the other of the limb sections of the archery bow, the composite structure 1' being joined to the front and rear sides of the handle section at the other end. A first type composite structure 1 may be used on the forward side of the handle section and a second type composite structure 1' may be used on the rear side of the handle section. Otherwise, either of the two types of composite structure 1 and 1' may also be employed in combination with a conventional type core material of substantially uniform thickness and made of a relatively hard but flexible wood without including any resilient sheet as described above.

The above described elongated members 1a, 1b, 1'a, and 1'b may be made of bamboo, maple or beech wood, or a resilient synthetic resin reinforced with glassfibers such as F.R.P. (fiberglass reinforced plastics) or the like, and the above described resilient sheet members 2 and 2' may be made of rubber, polyurethane, or ABS (acrylonitrile butadiene-styrene) resin. More specifically, the elongated members 1a and 1b or 1'a and 1'b made of either one of the above described materials are bonded together with the resilient sheet member 2 or 2' interposed therebetween, and the core material thus formed is thereafter shaped to have a desired distribution of the thicknesses as described above. Alternatively, either one of the elongated members 1a and 1b, and 1'a and 1'b may be made of bamboo or wood and the other of the elongated members may be made of a resilient synthetic resin reinforced with glassfibers or the like.

FIG. 3 shows an archery bow employing the above-mentioned composite structures 1 and 1' as cores of limb sections 3 thereof. At one of the limb sections 3, the two composite structure 1 are bonded together with the faces 1c thereof contacted with each other. The faces 1d of the core materials 1 are bonded respectively to the front and rear faces 4a and 4b of a handle section 4 of the archery bow at one end. The front and rear faces 4a and 4b of the handle section 4 are inclined at an acute angle with respect to each other and meet at a point.

At the other limb section 3, the two composite structure 1' are bonded together with the faces 1'c thereof contacted with each other. The faces 1'd are bonded respectively to the front and rear faces 4c and 4d of the handle section 4 at the other end. The front and rear faces 4c and 4d also incline at an acute angle with respect to each other and meet at a point of the farthest end of the handle section 4.

The composite structures 1 and 1' are covered with facing strips 5 and backing strips 6 which are made; for example, of fiberglass reinforced plastics (F.R.P.). The handle section 4 is made of rigid material such as hard wood.

Figure 4B:
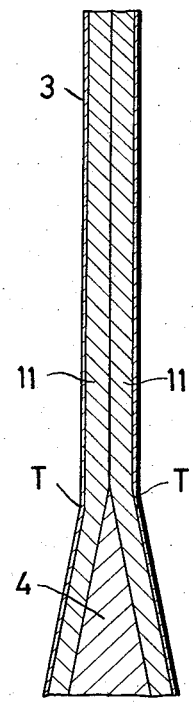

FIG. 4 shows, in an enlarged scale, the construction of the scarf-joined portion of the handle section 4 and the limb section 3 in comparison with the conventional constructions of the scarf-joined portions wherein respectively employed are core materials 11 of uniform thickness and another type of core materials 11' of substantially uniform thickness, the thickness of the latter being gradually reduced toward the ends thereof. In the conventional constructions shown in FIGS. 4(B) and (C), there appear abrupt turning points or abruptly bent portions T or T' in the tapers of the outer surfaces of the archery bows. The abrupt turning points or abruptly bent portions T and T' cause bending stresses and strain energy to concentrate on the scarf-joint, thus hindering the distribution of energy throughout the entire bows. On the contrary, it will be apparent from FIG. 4(A) that the thickness of the joining portion of the archery bow employing composite structure according to the present invention is smoothly reduced from the handle section 4, to the limb section 3 and that no turning point or bent portion in the taper as appeared in the conventional constructions is created in the construction of FIG. 4(A). For this reason, the bending stress created in the archery bow of this invention when the archery bow is drawn and the energy stored at that time are both distributed uniformly throughout the length of the archery bow, and no concentration of the bending stresses and the stored energy to a limited portion of the archery bow is observed in the construction of FIG. 4(A).

Figure 4C:
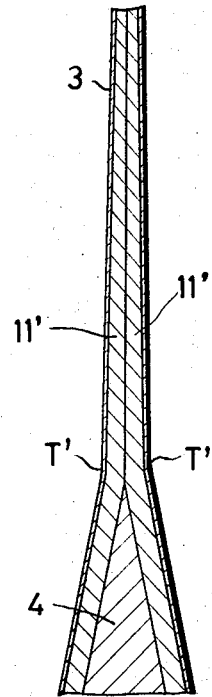
Figure 5A:
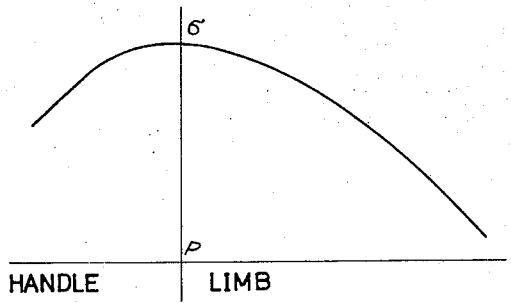
FIGS. 5(A), 5(B), and 5(C) are graphical representations of the stress distributions in the junction portions of the examples of the archery bows shown in FIGS. 4(A), 4(B), and 4(C), respectively.
Figure 5B:
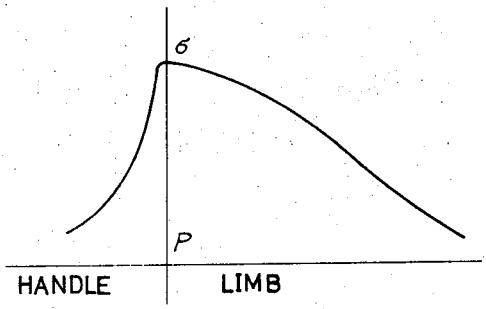
Figure 5C:
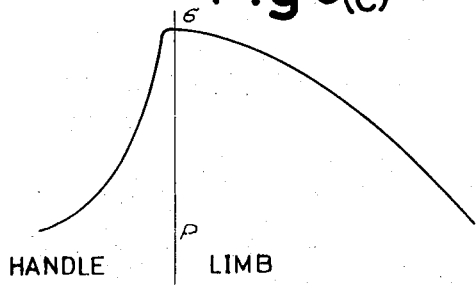

The above described advantageous feature of the archery bow employing the composite structure according to the present invention will be more clearly seen in FIGS. 5(A), 5(B), and 5(C) wherein the distributions of bending stresses within the archery bows shown in FIGS. 4(A), 4(B), and 4(C) are graphically indicated, respectively.

As is apparent from all of the above descriptions, the composite structure 1 and 1' each of which has it's thickest portion at about middle portion of its length and the thickness thereof is gradually reduced toward both ends thereof can effectively prevent the concentration of bending stresses in the joining portions between the handle section and the limb sections, and the bending stresses can be uniformly distributed throughout the limb sections. For this reason, the energy storing efficiency of the archery bow is elevated and the working life thereof is also increased. Furthermore, because of the existence of the resilient sheet member in each type of the composite structure flexibility of the archery bow is substantially increased and another advantageous feature of absorbing the shocks and vibrations caused when the arrow is released from the bow is also obtained.

What is claimed is:

1. A stress absorbent core for use with a limb section of a composite archery bow to reduce flexing stress concentrations on scarf joints and for binding a handle section to a limb section, said core comprising a plurality of configured, resilient composite structures, each of said composite structures comprising a plurality of substantially flat faces and a maximum thickness at a substantially intermediate portion thereof which tapers to a reduced thickness at each end of the composite structure, the plurality of substantially flat faces extending between the maximally thick portion of the composite structure and the tapered ends thereof, one of said composite structures being adapted to be joined to a front side of a handle section of a bow, at least one other of said composite structures being adapted to be joined to a rear side of a handle section of a bow and end portions of a bow limb, said composite structures being adapted to be joined to a front and rear side of a handle section of a bow along a flat face of each of said composite structures between the maximally thick portion of each of said composite structures and the tapered ends thereof, each of said composite structures comprising at least two relatively hard, flexible, configured, elongated members, at least one resilient sheet member interposed therebetween in a longitudinal direction of the elongated members, all of the elongated members being bonded together to form a generally flat configuration and a maximally thick intermediate portion and tapered end portions.

2. A core material as defined in claim 1 wherein said composite structure is formed into a configuration of generally flat rhombic form.

3. A core material as defined in claim 1 wherein said composite structure is formed into a configuration of generally flat triangular form.

4. The composite structure of claim 1 wherein the flexible, configured, elongated members are formed of material selected from the group consisting of bamboo, maple wood, beech wood and fiber glass reinforced resilient synthetic resin, and the resilient sheet member interposed between the flexible, configured, elongated members is selected from the group consisting of rubber and synthetic resin.

* * * * *